United States Patent [19]

Bodin

[11] 4,388,028
[45] Jun. 14, 1983

[54] SPLASH GUARD

[76] Inventor: Michael L. Bodin, 859 Old Mill Dr., Loveland, Ohio 45140

[21] Appl. No.: 221,345

[22] Filed: Dec. 29, 1980

[51] Int. Cl.³ .......................... B23C 9/00; B23B 47/00
[52] U.S. Cl. ...................................... 409/136; 408/57; 408/59; 408/241 G
[58] Field of Search ................. 408/241 G, 56, 57, 59, 408/60, 61, 110, 710; 409/134, 135, 136; 29/DIG. 50, DIG. 56, DIG. 59, DIG. 60, DIG. 61, DIG. 63, DIG. 64, DIG. 65, DIG. 66, DIG. 92, DIG. 94; 175/209-211, 214; 279/20

[56] References Cited

U.S. PATENT DOCUMENTS

| 994,430 | 6/1911 | Tunks | 408/241 G X |
|---|---|---|---|
| 2,409,525 | 10/1946 | Andreasson | 408/59 |
| 2,946,244 | 7/1960 | Maynard | 408/59 X |
| 2,977,827 | 4/1961 | Wenz | 408/59 |
| 3,024,030 | 3/1962 | Koch | 279/20 |
| 3,776,647 | 12/1973 | Hart | 408/241 G |
| 4,090,804 | 5/1978 | Haley | 408/59 |
| 4,132,497 | 1/1979 | Weller et al. | 408/241 G |
| 4,200,417 | 4/1980 | Hager et al. | 408/241 G X |

FOREIGN PATENT DOCUMENTS

| 2332832 | of 1977 | France | 408/57 |
|---|---|---|---|
| 209865 | of 1924 | United Kingdom | 175/211 |
| 303402 | of 1928 | United Kingdom | 279/20 |

*Primary Examiner*—William R. Briggs
*Assistant Examiner*—Steven B. Katz
*Attorney, Agent, or Firm*—Wood, Herron & Evans

[57] ABSTRACT

A splash guard for use in combination with a rotary oil hole type of cutting tool. The guard comprises an inducer ring rotatably mounted upon the rotary tool or the tool spindle, and having a shielding sleeve axially slideable over the inducer. Liquid coolant is flowed through the inducer to the tool spindle and subsequently to the tool cutting edge where it is ejected at relatively high pressures. The presence of the shielding sleeve surrounding the tool prevents that coolant from splashing the operator and the operator work station. The sleeve is spring biased into contact with a workpiece, but is free to move axially on the inducer as the tool cuts into the workpiece.

6 Claims, 4 Drawing Figures

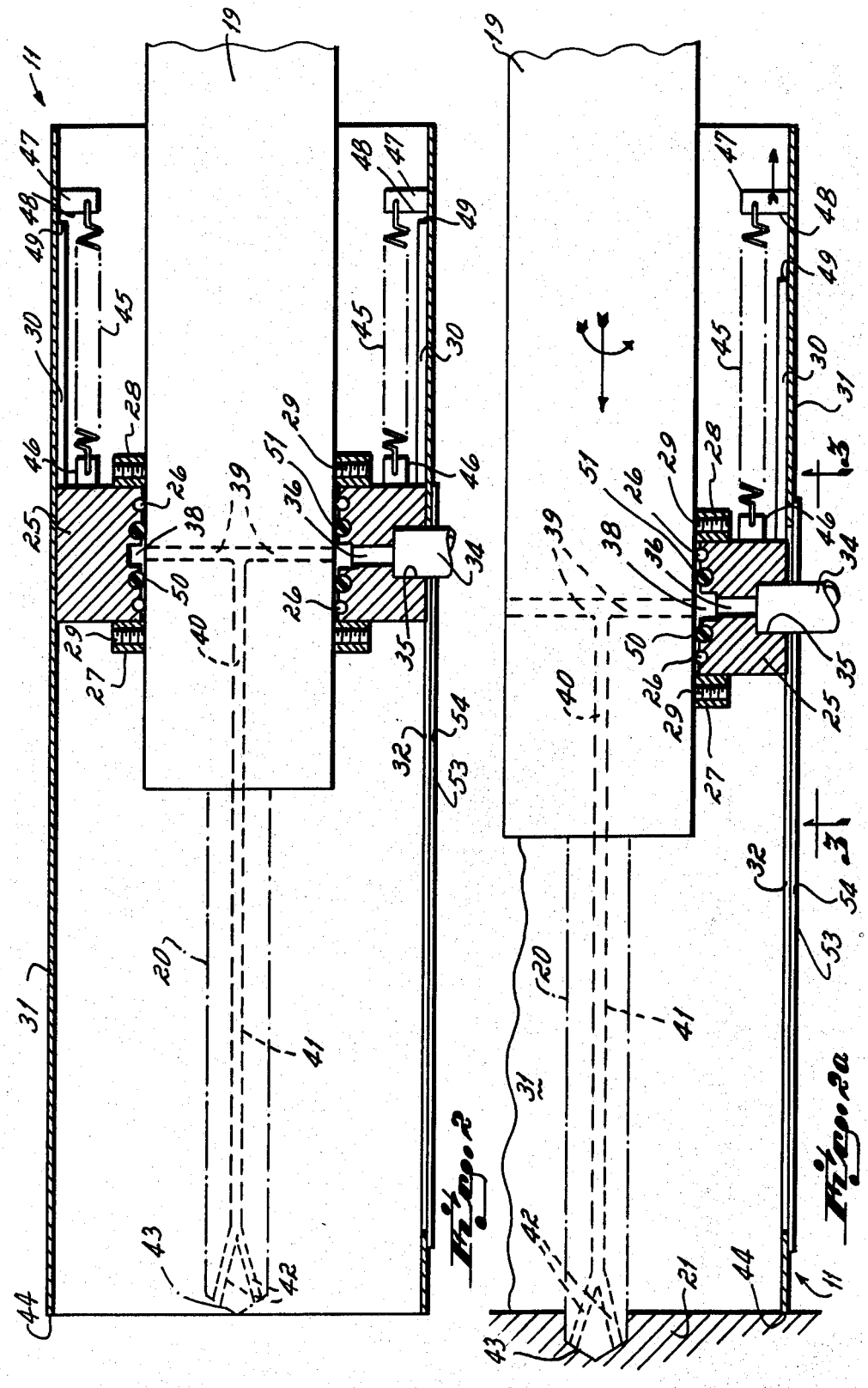

SPLASH GUARD

This invention relates to machine tools and more particularly to a splash guard for use in combination with such machine tools.

It is common practice to machine metal workpieces with rotary tools, as for example drills, boring tools, milling cutters in which liquid coolant is supplied through the interior of the tool to the tool cutting edge. This coolant flow has the dual effect of cooling the cutting edge of the tool and of washing chips from the cutting area so as to improve the efficiency of the tool cutting operation.

A common problem encountered with such "oil hole tools", is that of having the liquid coolant ejected from the tool splash off of the workpiece onto the operator or the operator work station. At best, this creates a nuisance and at worst it creates a safety hazard for the machine operator or personnel working in the vicinity of the machine in which the cutting is occurring.

There has been a long standing need for a simple inexpensive splash guard useful in combination with such rotary oil hole type tools, as for example oil hole tools of the type commonly employed in horizontal and vertical boring mills. It has therefore been an objective of this invention to provide such a splash guard.

In the past there have been numerous attempts to shield rotary cutting tools, usually for purposes of containing the metal chips or for purposes of enabling those chips to be vacuumed away from the work area. Patents which illustrate such sheilds are U.S. Pat. No. 3,776,647 and U.S. Pat. No. 4,200,417. The shields of these patents employ telescoping sleeves which enable the shield to move relative to the tool as the tool cuts into a workpiece. But, heretofore whenever telescoping sleeve type shields have been employed they have suffered from being insufficiently rigid as to enable them to be used on horizontal type machines. Furthermore, if such shields were used on machines wherein the workpiece was moved transversely relative to the axis of the rotary cutter, as for example in a milling operation, these shields lacked the rigidity to prevent flexing of the shield caused by relative movement of the workpiece relative to the shield.

Therefore, it has been another objective of this invention to provide a telescoping sleeve type of splash guard shield for use in combination with a rotary cutter type of machine tool which has sufficient rigidity to be useful when the axis of the shield is oriented in a horizontal plane and/or to be useful in combination with tools which require the workpiece to be moved laterally relative to the axis of a rotary tool.

According to the practice of this invention, a coolant inducer is rotatably attached to the shank or the supporting spindle of a rotary cutting tool. A telescoping sleeve is mounted over the coolant inducer and is spring biased to an extended position in which the shield contacts the workpiece. Liquid coolant is supplied through the shield to the coolant inducer and from the coolant inducer to the tool. The telescoping shield sleeve is guided for axial movement over the coolant inducer by shield guides which extend from the coolant inducer away from the workpiece. These guides permit the shielding sleeve to slide axially relative to the tool while still permitting the sleeve to be extended a substantial distance from the coolant inducer.

Multiple tension springs extend between the shield to the coolant inducer so as to bias the shield to an extended position. By using multiple springs, an even force is maintained between the telescoping sleeve and the workpiece. This even force prevents the sleeve from binding relative to the coolant inducer and relative to the workpiece.

The advantage of this construction is that it provides a relatively inexpensive, efficient splash guard for rotary cutting tools which confines the splash of the coolant within the shield and which also confines the machined chips within the splash guard shield.

These and other objects and advantages of this invention will be more readily apparent from the following description of the drawings in which:

FIG. 2 is a cross-sectional view taken through the splash guard of FIG. 1.

FIG. 2a is a cross-sectional view similar to FIG. 2, but illustrating the tool partially advanced into a workpiece.

FIG. 3 is an elevational view taken on line 3—3 of FIG. 2a.

Figure 1:
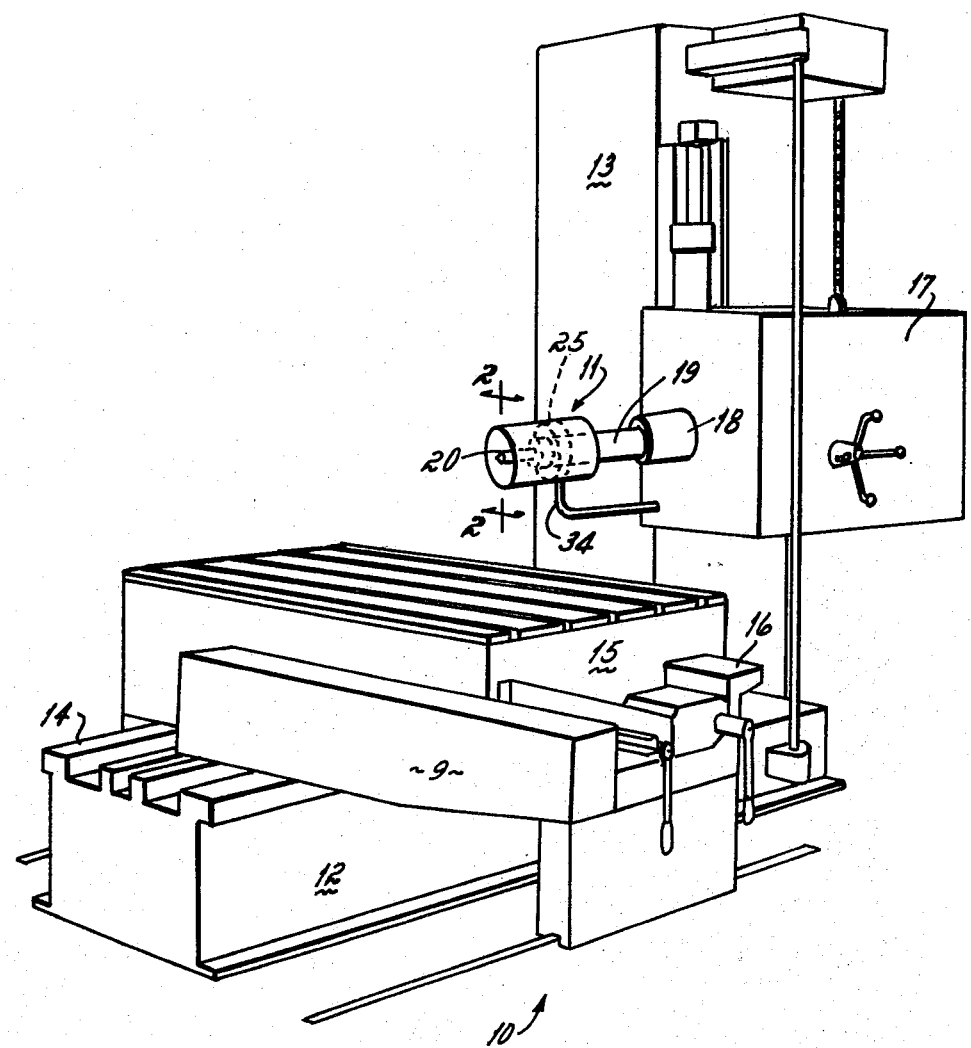
FIG. 1 is a perspective view of a horizontal boring machine having the improved splash guard of this invention applied thereto.
Figure 3:
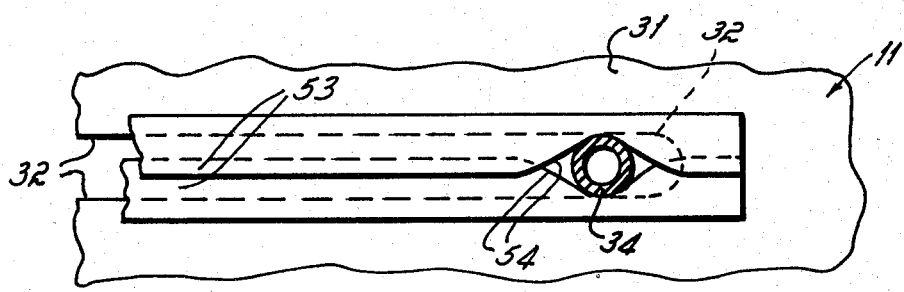

Referring to FIG. 1 there is illustrated a horizontal boring mill 10 upon which there is mounted the splash guard 11 of this invention. This horizontal boring mill is conventional and forms no part of the invention of this application. It is only illustrated for purposes of showing a typical machine of the type to which this invention is commonly applied.

This boring mill 10 comprises a fixed base 12 and a fixed vertical column 13. There is a longitudinal slide 9 movable over ways 14 of the base 12 and a table or cross slide 15 transversely movable over ways 16 of the slide 9. A tool support head 17 is vertically movable upon the column 13. This head 17 carries a quill 18 within which there is mounted a tool support spindle 19. A rotary tool, as for example, an oil hole drill 20, is mounted within the spindle 19. The quill 18 is axially movable within the head 17 for purposes of feeding the tool into a workpiece 21 (FIG. 2a).

Referring now to FIG. 2 it will be seen that there is a coolant flow inducer 25 rotatably mounted upon the spindle 19. This inducer 25 is in the form of a ring mounted over the spindle and supported for rotational movement thereon by a series of roller bearings 26. A pair of thrust rings 27, 28 are mounted on opposite sides of the coolant inducer and are fixedly secured to the spindle by set screws 29. These thrust rings permit rotational movement of the spindle relative to the inducer but preclude relative axial movement between the spindle and the inducer.

A series of shield guides 30 extend rearwardly from the inducer 25. These guides 30 may be in the form of a single annular lip which extends rearwardly from the inducer 25 or as preferred, in the form of multiple spaced segments of a lip.

A splash shield or sleeve 31 is mounted over the coolant inducer 25. This sleeve 31 is mounted for axial sliding movement relative to the inducer 25 and is supported for such movement solely by the peripheral surface of the coolant inducer 25 and the guides 30.

The sleeve 31 is provided with a longitudinal slot 32 through which a fluid supply conduit 34 extends. This conduit has one end fixedly secured within a counterbored hole 35 in one side of the inducer and the other end connected to a pressurized source of liquid coolant (not shown). The hole 35 within which the conduit 34 is mounted has a smaller diameter section 36 in fluid communication with an annular recess 38 formed on the inside wall of the coolant inducer. Seals 50, 51 located on opposite sides of the annular recess 38 prevent the escape of coolant between the inducer 25 and the spindle 19. The annular recess 38 communicates with radial passages 39 in the tool spindle 19. These passages 39 connect the coolant conduit 34 to the tool tip via an axial passage 40 in the spindle and a coaxial passage 41 in the tool 20. At its outer end, the passage 41 diverges to form conduits 42 which extend to the cutting edges 43 of the tool 20.

In the illustrated embodiment, the cutting tool 20 is an oil hole drill, but it could as well be a boring tool, face milling cutter, trepanning tool or any other conventional type of rotary cutting tool having an oil hole passage therethrough through which coolant is supplied to the tool cutting edge.

The telescoping sleeve or shield 31 is biased by tension springs 45 to a position in which the forwardmost end surface 44 of the shield extends slightly beyond the forwardmost edge of the cutting tool. These tension springs, which are preferably three in number, extend between protrusions 46 formed on the rear edge of the coolant inducer and protrusions 47 formed on the inside of the shield 31. These protrusions 46, 47 have holes therein through which the ends of the springs 45 extend and are secured. The springs 45 are tensioned so that they tend to pull the protrusions 47 and thus the attached shield forwardly until the forward edges 48 of the protrusions 47 contact the rear edges 49 of the guides 30. In this position of the shield, the forward edge 44 of the shield extends slightly beyond the cutting edges 43 of the tool 20.

As was mentioned hereinabove, the fluid flow conduit 34 extends through a longitudinal slot 32 of the shield 31. This conduit 34 is preferably rigidly attached to the head 17 of the machine so as to prevent rotation of the coolant inducer relative to the tool spindle. Alternatively, the conduit 34 may be in the form of a flexible hose in which event a fixed torque limiting stop may be attached to the coolant inducer and engageable with some other portion of the machine so as to prevent rotation of the inducer relative to the spindle.

In use or operation of the machine and splash guard 11, the tool spindle is moved relative to a workpiece supported upon the table 15 until the cutting edge 43 of the rotary tool 20 is either contacting or in close proximity to the surface of the workpiece to be machined. At that point, the leading edge 44 of the shield 31 contacts the surface of the workpiece. Coolant flow to the tool 20 is then initiated by turning on the flow of coolant to the conduit 34. This coolant flows through the conduit 34 and passages 36, 39, 40 to the tool top where it emerges from the passages 42. Upon emerging from the tool tip, the coolant splashes against the workpiece but the splash is maintained on the interior of the shield and is thereby prevented from contacting a worker or contaminating the work area surrounding the machine 10. By so containing the coolant and preventing the splash, the work area around the machine 10 is rendered free of coolant which would otherwise wet down and contaminate the work area surrounding the machine 10.

As the cutting tool 20 advances into the workpiece 21, the shield 31 is forced rearwardly over the coolant inducer 25. Thus there is a relative telescoping movement of the shield or sleeve 31 over the inducer 25. In the course of such movement, the conduit 34 moves through the slot 32 in the side of the sleeve or shield 31. To permit such movement, while still maintaining the slot closed, there is preferably a flexible curtain 53 secured over the slot. This curtain is longitudinally split as illustrated at 54 so as to permit the conduit 34 to move through the slot and to open the curtain as the sleeve 31 is moved relative to the conduit 34. The slotted flexible curtain 53 thus serves not only to close the slot 32 in the sleeve, but also to permit overflowed coolant and chips contained within the sleeve which might otherwise tend to jam within the sleeve to escape through the slot.

The primary advantage of the splash guard of this invention is that it provides a relatively inexpensive splash guard shield for an oil hole type of cutting tool. The shield also has the advantage of being so constructed that it may be attached to a machine having a horizontal spindle or a vertical spindle and be equally effective on both.

While I have described only a single preferred embodiment of my invention, persons skilled in the art to which it pertains will appreciate numerous changes and modifications which may be made without departing from the spirit of my invention. Therefore, I do not intend to be limited except by the scope of the following appended claims:

I claim:

1. A splash guard for use in combination with a rotary tool having coolant flow passages extending through the tool to the tool cutting edges, said splash guard comprising
   a non-rotatable coolant flow inducer ring adapted to be mounted over a rotatable portion of said tool,
   thrust rings located upon opposite sides of said coolant flow inducer ring for securing said non-rotatable inducer ring to said rotary tool,
   means for fixedly securing said thrust rings to said rotatable portions of said tool,
   a coolant flow conduit connected to said inducer ring for supplying liquid coolant to said inducer ring,
   coolant flow passageway means extending through said inducer for connecting said coolant flow conduit to the coolant flow passages in said rotary tool,
   sealing means for forming a liquid seal between the non-rotatable inducer ring and said rotatable tool,
   guide means extending generally longitudinally from one side of said inducer ring,
   a splash shield sleeve mounted over said inducer ring and said guide means, said sleeve being longitudinally slideable relative to said inducer ring and guide means, and
   spring means connected to said inducer ring and to said sleeve for biasing said sleeve to an extended position in which said sleeve extends longitudinally over the cutting edge of said rotary tool, said spring means permitting said sleeve to be forced by contact with a workpiece longitudinally away from said cutting edge as said rotary tool cuts into said workpiece.

2. The splash guard of claim 1 in which said splash shield sleeve has a longitudinal slot in one side, said coolant flow conduit extending through said slot.

3. The splash guard of claim 2 in which said slot of said splash shield sleeve is closed by a flexible curtain.

4. In combination, a splash guard and a rotary tool, said tool having coolant flow passages extending through the tool to tool cutting edges, said splash guard comprising a non-rotatable coolant flow inducer ring mounted over a rotatable portion of said tool, thrust rings located upon opposite sides of said coolant flow inducer ring for securing said non-rotatable inducer ring to said rotary tool, means for fixedly securing said thrust rings to said rotatable portion of said tool, a coolant flow conduit connected to said inducer ring for supplying liquid coolant to said inducer ring, coolant flow passageway means extending through said inducer for connecting said coolant flow conduit to the coolant flow passages in said rotary tool, sealing means for forming a liquid seal between the non-rotatable inducer ring and said rotatable tool, guide means extending generally longitudinally from one side of said inducer ring, a splash shield sleeve mounted over said inducer ring and said guide means, said sleeve being longitudinally slideable relative to said inducer ring and guide means, and spring means connected to said inducer ring and to said sleeve for biasing said sleeve to an extended position in which said sleeve extends longitudinally over the cutting edge of said rotary tool, said spring means permitting said sleeve to be forced by contact with a workpiece longitudinally away from said cutting edge as said rotary tool cuts into said workpiece.

5. The combination of claim 4 in which said splash shield sleeve has a longitudinal slot in one side, said coolant flow conduit extending through said slot.

6. The combination of claim 5 in which said slot of said splash shield sleeve is closed by a flexible curtain.

* * * * *